June 15, 1937.  F. J. LYDEN  2,084,058
CONDENSER MOTOR
Filed Dec. 19, 1935   2 Sheets-Sheet 1

INVENTOR
*Frank J. Lyden*
BY
ATTORNEY

June 15, 1937.  F. J. LYDEN  2,084,058
CONDENSER MOTOR
Filed Dec. 19, 1935  2 Sheets-Sheet 2

INVENTOR
Frank J. Lyden
BY
Arthur R. Woolfort
ATTORNEY

Patented June 15, 1937

2,084,058

UNITED STATES PATENT OFFICE 2,084,058

CONDENSER MOTOR

Frank J. Lyden, Indianapolis, Ind.

Application December 19, 1935, Serial No. 55,240

18 Claims. (Cl. 172—233)

This invention relates to single phase alternating current motors of the condenser type.

It is an object of this invention to provide a condenser motor which gives maximum starting torque for a given condenser capacity by proper selection of the ratio of the effective number of turns in the main phase to the effective number of turns in the auxiliary phase at starting.

A further object is to provide a condenser motor which has good running performance, which has maximum quietness by rearranging the starting ratio of the effective number of turns in the main phase to the effective number of turns in the auxiliary phase for the desired running performance, and at the same time rearranging the condensers used at starting to secure the desired effective condenser capacity at running speed.

A further object is to provide a condenser motor in which the ratio of the effective number of turns in the main phase to the effective number of turns in the auxiliary phase between the starting and running may be changed within a wide range by means of a single pole single throw switch.

A further object is to provide a condenser motor in which automatic switching is obtained with extreme simplicity considering the changes accomplished with this simple type of switch.

A further object is to provide a condenser motor in which the automatic switch may be relay controlled.

A further object is to provide a condenser motor which may be of the double voltage type with no changes in connection of the auxiliary winding, condensers, or control means.

A further object of this invention is to provide a single or double voltage reversible motor having a minimum number of leads.

This invention is a continuation in part of that disclosed in my copending application Serial No. 707,724 filed January 22, 1934, for Condenser motor, which matured into Patent No. 2,028,230 on January 21, 1936.

Embodiments of the invention are shown in the accompanying drawings, in which.

Figure 1:
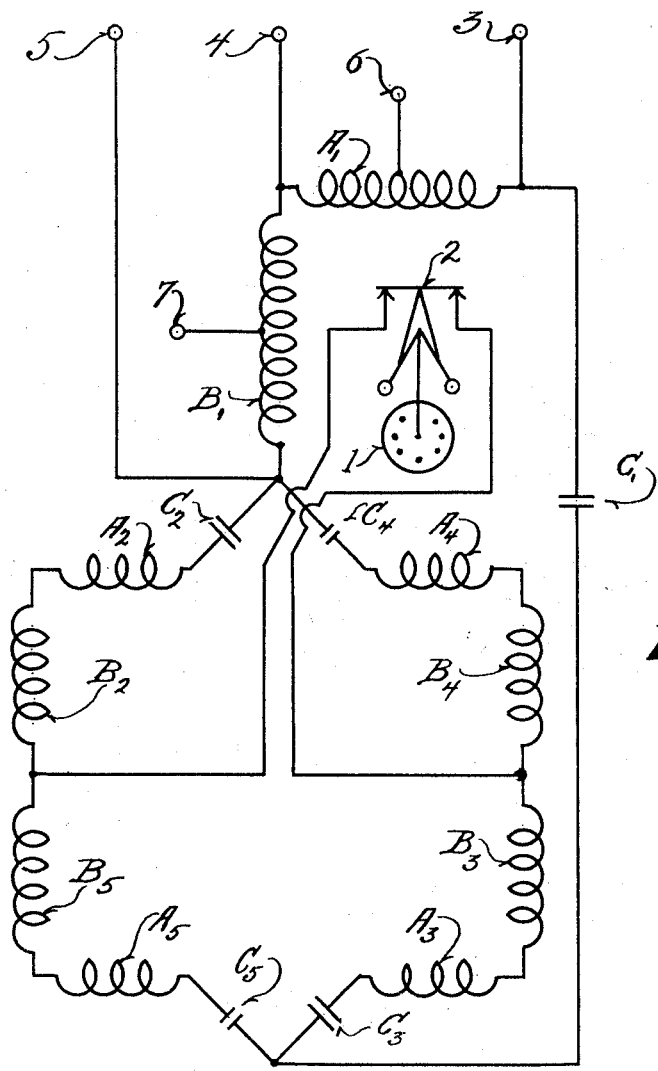
Figure 1 is a diagrammatic view of one of the forms of the condenser type motor, such view showing the most general form that the motor may take, such view also showing a single or double voltage motor which may be of the reversible type if so desired, and showing a centrifugal type of automatic switch.

It is to be distinctly understood that the particular views chosen for illustration are merely a few of the many forms that the motor may take and do not in any way exhaust the possible forms, it being thought, however, that a showing of the most general form, as in Figure 1, and a few of the details would suffice to illustrate the general flexibility of the type of motor and its general applicability.

In each form of the invention the horizontally disposed windings are intended to indicate the main phase and the vertically disposed windings are intended to indicate the auxiliary phase.

In each form of the invention a bridge circuit has been employed for giving the single phase motor the desired characteristics such as the particular starting characteristics—medium, high and very high starting torque—and the particular type of running characteristics desired, it being noted that this invention provides a motor in which the particular starting characteristics may be made anything desired without affecting the running characteristics, and similarly the running characteristics may be made anything desired without affecting the starting characteristics.

This invention also provides a motor which has almost the quietness of a polyphase motor, though it is of the single phase type, and which is efficient under both running and starting conditions.

The most general form that the motor may take is shown in Figure 1 and it will be seen that the main phase is represented by the reference character $A_1$ and this main phase includes main phase extensions $A_2$, $A_3$, $A_4$ and $A_5$. All of these sections are positioned in the same slots as the main phase winding $A_1$. The auxiliary phase winding is indicated by the reference character $B_1$ and this includes the auxiliary phase extensions $B_2$, $B_3$, $B_4$ and $B_5$. All of these auxiliary phase sections or extensions are wound in the same slots as the auxiliary phase winding $B_1$.

All of the sections are, of course, connected in such a way that their voltages add and do not oppose, although possible, and the sections as shown in Figure 1 must be connected so that this result obtains. Voltages are set up in the various extensions of the main phase windings by transformer action due to the fact that they are all in the same slots.

If the turns in some of the sections in the same phase are equal, then no tapped winding has to be used, but a series parallel connection can be employed. Also, suppose that the turns in $B_2$, for example, equal the number of turns in $B_3$. Then on a four-pole motor two poles are used for $B_2$ and two poles for $B_3$. It would be possible to use each pole as one section and a four-pole motor would give four sections, a six-pole motor could give two, three or six sections, etc.

In considering Figure 1, it is apparent that if all of the condensers $C_2$, $C_3$, $C_4$ and $C_5$ are of the same capacity and all of the turns in the main phase extensions are alike, and all of the turns in the auxiliary phase extensions are alike, then it does not matter whether the automatic switch is opened or closed because the bridge is absolutely balanced.

On the other hand, as soon as this balance is disturbed, then obviously when the switch is closed, as in starting, a different effect is produced from that when the switch is opened, as in running for instance.

This disturbed balance may be produced by either the use of unequal condensers, such for example as having $C_2$ equal $C_3$ and this value greater or less than $C_4$, which in turn may equal $C_5$, or by having an unequal number of turns in either section of the main phase extensions, for example, $A_2$ may equal $A_3$ and this value may be greater or less than $A_4$, which in turn may equal $A_5$, or in the auxiliary phase extension in which, for example, the number of turns in $B_2$ can equal $B_3$ and this value may be greater or less than the number of turns in $B_4$, which latter may be equal to the number of turns in $B_5$.

A still further arrangement could be had by having both the condenser capacities different and the number of turns different.

Under any of these conditions there will be a difference in effect between the switch opened and the switch closed positions.

It is apparent that if, for example, the values of $C_2$ and $C_3$ are relatively large and relatively greater than that of $C_4$ and $C_5$, that when the switch is closed, as in starting, a relatively large condenser effect is produced in both the auxiliary and in the main phase extensions, as the condensers $C_2$ and $C_3$ are then virtually in series with the remainder of the circuit, that is, with the sections $A_2$, $B_2$, $B_3$ and $A_3$.

Now when the switch opens as, for example, when the motor attains a predetermined speed if a centrifugal switch is used or when a predetermined voltage occurs across one of the sections, as will be hereinafter described, it is apparent that a lesser condenser effect is produced as the condenser $C_2$ is now in series with the condenser $C_5$, the condenser $C_5$ being of smaller value, and the condenser $C_3$ is in series with the condenser $C_4$, the condenser $C_4$ being of smaller value. Thus, under running conditions a lesser condenser effect is produced than under starting conditions.

Also it is apparent that the number of turns in the various sections may be selected as desired to produce the desired starting characteristics and also the desired running characteristics, and these several selections of values may be made in such a way that the starting characteristics do not affect the running characteristics or vice versa.

The net results would be the reduction of the effective condenser capacity or the reduction of the effective number of turns in the auxiliary phase, for instance, or in the main phase extensions if so desired, or the reduction of voltage set up in the auxiliary phase from starting to running resulting in a high starting torque.

It is to be understood that the auxiliary phase may be wound in the same manner as the main phase, but is displaced from the main phase. For example, it may be displaced 90° and this has been found the preferable electrical angular displacement.

It is apparent that Figure 1, which shows the most general form of the motor, can be altered by omitting various parts thereof to produce different forms of the invention. For example, if the sections $A_2$, $A_3$, $A_4$ and $A_5$, $B_4$ and $B_5$ are omitted, then the particular type of condenser motor disclosed in one form in my copending application hereinabove noted will result. In other words, a condenser type motor will result in which the auxiliary phase has extensions and the condenser effect is varied from starting to running conditions, all as described in greater detail in my copending application.

It is to be noted particularly that this type of motor may very readily be made for a two-voltage motor. For example, the leads 3 and 4 can be employed if a high voltage line is used and the leads 4 and 6 can be employed if a lower voltage line is used. On the other hand, if it is desired to reverse the motor, as, for example, when there is approximate symmetry in the sections of the auxiliary and main phase windings and their respective circuits, it is obvious that the lead 3 may be disconnected and the line connected to the lead 5, which obviously would reverse the direction of rotation of the motor. The automatic switch would still properly operate whether of the centrifugal type as shown or whether of the voltage or current relay type. Also it is apparent that the reversal could occur for a low voltage line as in this case the line ordinarily leading to the point 6 would then be connected to the point 7.

It is apparent that the utmost flexibility exists for the motor forming the subject matter of this invention.

A certain condenser capacity is required to get a certain starting torque, as is apparent. Also it is clear that a certain ratio of auxiliary phase turns to main phase turns will give the maximum starting torque for a given condenser capacity. This ratio of auxiliary phase turns to main phase turns may be greater than 1 for a medium starting torque, may be equal to 1 for high starting torque, or may be less than 1 for extremely high starting torque.

Also it is clear that the action of a two-phase motor may be duplicated by this single phase condenser type motor for all substantial particulars, such single phase motor being preferably balanced, that is, the same number of ampere turns and voltage on each phase and a ratio of 1 for auxiliary phase turns to main phase turns at running speed. This result may be readily accomplished by properly proportioning the sections and the condensers, as hereinbefore indicated. Additionally, it is preferable to reduce the effective condenser capacity from starting to running and any ratio of values may be obtained.

Figure 2:
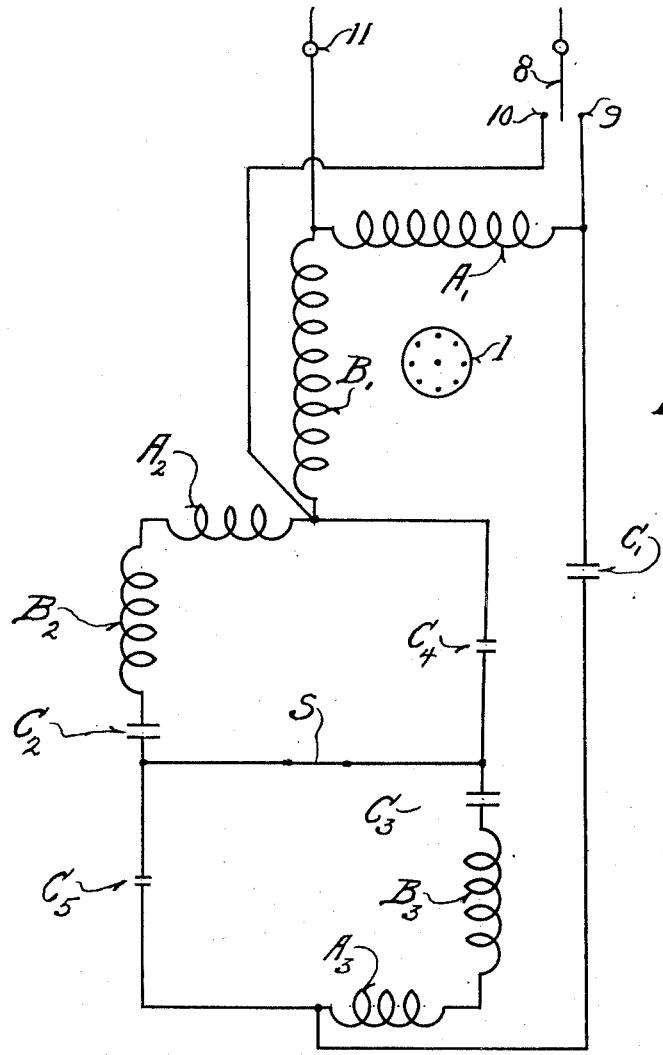
Figure 2 is a diagrammatic view showing a further form that the invention may take.

One of the many forms that the invention may take and which is derived from the most general form shown in Figure 1 is indicated in Figure 2. For the sake of clearness the switch is indicated at S and may be of any form, either the centrifugal type or the relay type. The sections of the main phase extensions $A_2$ and $A_3$ are employed and the sections of the auxiliary phase extensions $B_2$ and $B_3$ are employed. The condensers $C_2$ and $C_3$ are relatively large and the condensers $C_4$ and $C_5$ are relatively small.

Preferably a relatively large condenser $C_1$ is provided. The same numbering as that employed in Figure 1 has been used for the various sections and for the condensers. This motor may be reversible if desired by providing a switch 8 which may engage either the terminal or contact 9 and the terminal or contact 10, the terminal 11 going to the other line.

The bridge circuit has the switch S closed during starting and it is apparent that a relatively large condenser effect is produced as the large condensers $C_2$ and $C_3$ are in series during starting.

The sections $A_2$ and $A_3$ are not displaced in space from the section $A_1$, but instead are wound so as to have the same polarity as the section $A_1$.

The auxiliary phase is displaced 90° from the section $A_1$ and is wound in groups similar to the main phase and its extensions, namely, the sections $B_1$, $B_2$ and $B_3$.

The method of winding may be the same as that previously described.

When the motor is starting, the switch S is closed and the auxiliary phase sections $B_2$ and $B_3$ are thus connected in series, giving more torque for a given condenser capacity. The main phase extensions $A_2$ and $A_3$ are also connected in series, thus raising the voltage. The condensers $C_2$ and $C_4$ are in substantial parallel and both are in series with the parallel connected condensers $C_3$ and $C_5$, resulting in a high effective condenser capacity.

At running the switch S is opened and the two sections of the auxiliary phase $B_2$ and $B_3$ and the main phase extensions $A_2$ and $A_3$ are in parallel. The high capacity condenser $C_2$ is in series with the low capacity condenser $C_5$ and the high capacity condenser $C_3$ is in series with the low capacity condenser $C_4$ and the circuits are adjusted to give proper running performance.

Figure 3:
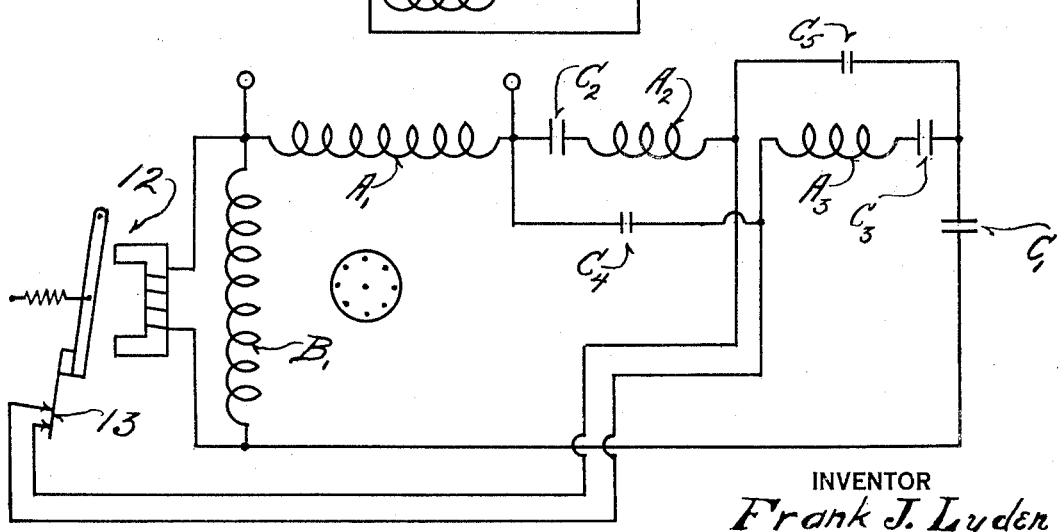
Figure 3 shows a still further form of the invention and shows the use of a relay type automatic switch.

In the form of the invention shown in Figure 3, the main phase alone is provided with the extensions or extra sections. In this form of the invention the capacity of the condensers $C_2$ and $C_3$ as well as condenser $C_1$ is in each instance relatively high and considerably greater than the lower capacity or small capacity condensers $C_4$ and $C_5$. In this form of the invention any type of automatic switch may be employed, for example the centrifugal switch as previously described, but in the particular form chosen for illustration a voltage relay automatic switch has been shown and connected across the auxiliary phase $B_1$.

This automatic relay switch is indicated generally at 12, the switch portion being indicated at 13. The switch is closed at starting and connects the sections $A_2$ and $A_3$ in series. The relatively large condensers $C_2$ and $C_3$ are connected in series during starting. At a predetermined speed or at running speed, for instance, the automatic relay opens and the sections $A_2$ and $A_3$ are now in parallel, the condenser $C_2$ being in series with the smaller condenser $C_5$ and the condenser $C_3$ being in series with the smaller condenser $C_5$.

Obviously the condenser $C_1$ could be omitted if so desired.

This form of the invention raises the voltage across the auxiliary phase circuit and similarly to the forms previously described does not use any external means but accomplishes this inside of the motor during starting with a reduction of effective condenser capacity when the motor is up to speed.

It is to be distinctly understood that the condenser $C_1$ in any of the forms of the invention can be omitted if so desired.

Figure 4:
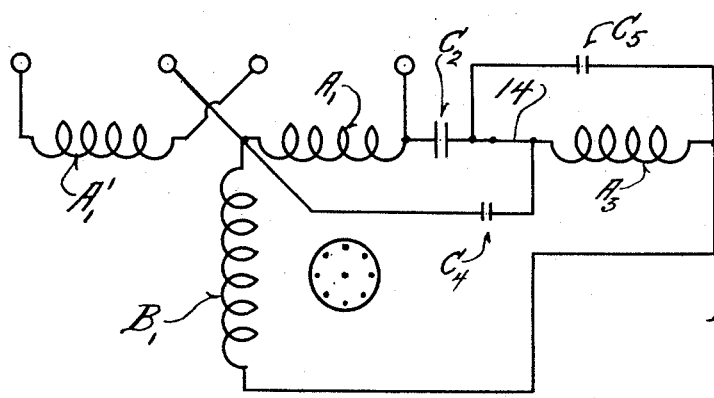
Figure 4 shows a still further form of the invention in which means are provided for either a single or double voltage motor.

A still further simplification of the invention and also a form different from the most general form illustrated in Figure 1 is shown in Figure 4, in which the main phase is indicated at $A_1$ and has a single extension $A_2$, the auxiliary phase being indicated at $B_1$. The condenser $C_2$ is of relatively large capacity and the condensers $C_5$ and $C_4$ of relatively smaller capacity. The switch is indicated at 14 and may be of any of the types, such as previously described. If desired, an extra main phase winding $A_1'$ may be provided and may be connected in parallel with $A_1$ for a low voltage line or in series therewith for a high voltage line, in a well known manner.

The switch 14 is closed at starting and thus a relatively large condenser effect is provided in the circuit of the main phase winding and in its extension. However, when the motor comes up to speed, the switch 14 opens and thus the condenser capacity is reduced, as the condenser $C_2$ is now in series with the condenser $C_5$ and the sections $A_1$ and $A_2$ are in parallel.

It will be seen that a novel form of condenser motor has been provided which may have a very high starting torque, which has excellent running performance, which is very quiet in operation, and in which any starting characteristics and any running characteristics may be secured by the proper design, as indicated hereinabove, and in which each of these characteristics may be secured without affecting or sacrificing the other characteristics.

It is to be particularly noted that although a certain number of turns and a certain effective capacity for the auxiliary phase, and a different effective number of turns and a different capacity are provided at starting and during running, that nevertheless a single pole single throw switch may be employed. In other words, a very simple type of switching arrangement may be used.

It will be seen that this invention provides a motor which can produce widely different results for the following reasons:

1. By a proper selection of condensers the effective condenser capacity can be varied from starting to running.

2. By a proper proportioning of the number of turns in the auxiliary phase extensions $B_2$, $B_3$, $B_4$ and $B_5$ the proper ratio of starting ampere turns to running ampere turns can be had, this being equivalent to a change of the effective number of turns from starting to running.

3. By properly selecting the number of turns in the main phase extensions $A_2$, $A_3$, $A_4$ and $A_5$ any desired voltage variation across the auxiliary phase circuit can be obtained from starting to running.

It will be seen further that a single or double voltage motor has been provided which may be reversible if desired and which has a minimum number of leads.

The expression "condenser" as used in the claims is intended to be interpreted as a condenser unit and may be either a condenser alone, as indicated, or may be a condenser unit in which the voltage actually impressed on the condenser may be stepped up by means of a transformer in a well known manner, although it is not thought necessary to illustrate this construction in the drawings.

Although this invention has been described in considerable detail, it is to be understood that such description is intended as illustrative rather than limiting, as the invention may be variously embodied and is to be interpreted as claimed.

I claim:

1. In a single phase condenser motor of the class described having two members constituting a stator and a rotor, a main phase winding for connection to a power line and an auxiliary phase winding on one of said members, one of said phase windings having a plurality of sections, condenser means having a plurality of sections certain of which have different values, a four-arm bridge circuit formed by part of the sections of the last mentioned phase winding and the condenser means, each of two of the arms of the bridge circuit having at least one of the said sections of the last mentioned phase winding and the other two arms each having condenser means therein, a switch connected to the cross arms of the bridge, said bridge circuit constituting a part of at least one of said phases and being connected in series with the remainder of one of said phases and in parallel with the other of said phases, said switch having a closed circuit and an open circuit position, said switch in closed circuit position producing one effect of the turns of at least one of said phases and a certain effective condenser capacity, and when in open circuit position decreasing the effect of the turns in said last mentioned phase and the effective condenser capacity.

2. A single phase condenser motor of the class described having two members constituting a stator and a rotor, a main phase winding for connection to a power line and an auxiliary phase winding on one of said members, said main phase winding having a plurality of sections, condenser means having a plurality of sections, a four-arm bridge circuit formed by part of the sections of the main phase winding and the condenser means, each of two of the arms of the bridge circuit having at least one section of the main phase and the other two arms each having condenser means therein, a switch connected to the cross arms of the bridge, said bridge constituting a part of one of said phases and being connected in series with the remainder of said last mentioned phase and in parallel with the other of said phases, said switch having a closed circuit and an open circuit position, said switch in closed circuit position producing one effect of the turns of the main phase and a certain effective condenser capacity and when in open circuit position decreasing the effect of the turns of the main phase and the effective condenser capacity.

3. A single phase condenser motor of the class described having two members constituting a stator and a rotor, a main phase winding for connection to a power line and an auxiliary phase winding on one of said members, said main phase winding and said auxiliary phase winding having a plurality of sections, condenser means having a plurality of sections, a four-arm bridge circuit formed of part of the sections of the main and auxiliary phases and the condenser means, each of two of the arms of the bridge circuit having at least one section of the main and auxiliary phase and the other two arms each having condenser means therein, a switch connected to the cross arms of the bridge, said bridge circuit constituting a part of one of said phases and being connected in series with the remainder of said last mentioned phase and in parallel with the other phase, said switch having a closed circuit and an open circuit position, said switch in closed circuit position producing one effect of the turns of the main and auxiliary phase and a certain effective condenser capacity and when in open circuit position decreasing the effect of the turns of at least one of said phases and the effective condenser capacity.

4. In a single phase condenser motor of the class described having two members constituting a stator and a rotor, a main phase winding for connection to a power line and an auxiliary phase winding on one of said members, one of said phase windings having a plurality of sections, condenser means having a plurality of sections, a four-arm bridge circuit formed by part of the sections of the last mentioned phase winding and the condenser means, each of two of the arms of the bridge circuit having at least one of the said sections of the last mentioned phase winding and the other two arms each having condenser means therein, a switch connected to the cross arms of the bridge circuit, said bridge circuit constituting a part of at least one of said phases and being connected in series with the remainder of one of said phases and in parallel with the other of said phases, said switch having a closed circuit and an open circuit position, said switch in closed circuit position producing one effect of the turns of at least one of said phases, and when in open circuit position decreasing the effect of the turns in said last mentioned phase.

5. In a single phase condenser motor of the class described having two members constituting a stator and a rotor, a main phase winding for connection to a power line and an auxiliary phase winding on one of said members, one of said phase windings having a plurality of sections, condenser means having a plurality of sections of different values, a four-arm bridge circuit formed by part of the sections of the last mentioned phase winding and the condenser means, each of two of the arms of the bridge circuit having at least one of the said sections of the last mentioned phase winding and the other two arms each having condenser means therein, a switch connected to the cross arms of the bridge circuit, said bridge circuit constituting a part of at least one of said phases and being connected in series with the remainder of one of said phases and in parallel with the other of said phases, said switch having a closed circuit and an open circuit position, said switch in closed circuit position producing a certain effective condenser capacity, and when in open circuit position decreasing the effective condenser capacity by connecting in series condenser means of different values.

6. A single phase condenser motor of the class described having two members constituting a stator and a rotor, a main phase winding for connection to a power line and an auxiliary phase winding on one of said members, said main phase winding having a plurality of sections, condenser means having a plurality of sections, a four-arm bridge circuit formed by part of the sections of the main phase winding and the condenser means, each of two of the arms of the bridge circuit having at least one section of the main phase and the other two arms each having condenser means therein, a switch connected to the cross arms of the bridge circuit, said bridge circuit constituting a part of one of said phases and being connected in parallel with the other of said phases, said switch having a closed circuit and an open circuit position, said switch in closed circuit position producing one effect of the turns of the main phase, and when in open circuit position decreasing the effect of the turns of the main phase.

7. A single phase condenser motor of the class described having two members constituting a stator and a rotor, a main phase winding for connection to a power line and an auxiliary phase winding on one of said members, said main phase winding having a plurality of sections, condenser means having a plurality of sections, a four-arm bridge circuit formed by part of the sections of the main phase winding and the condenser means, each of two of the arms of the bridge circuit having at least one section of the main phase and the other two arms each having condenser means therein, a switch connected to the cross arms of the bridge circuit, said bridge circuit constituting a part of one of said phases and being connected in parallel with the other of said phases, said switch having a closed circuit and an open circuit position, said switch in closed circuit position producing a certain effective condenser capacity, and when in open circuit position decreasing the effective condenser capacity.

8. A single phase condenser motor of the class described having two members constituting a stator and a rotor, a main phase winding for connection to a power line and an auxiliary phase winding on one of said members, said main phase winding and said auxiliary phase winding having a plurality of sections, condenser means having a plurality of sections, a four-arm bridge circuit formed of part of the sections of the main and auxiliary phases and the condenser means, each of two of the arms of the bridge circuit having at least one section of the main and auxiliary phase and the other two arms each having condenser means therein, a switch connected to the cross arms of the bridge circuit, said bridge circuit constituting a part of one of said phases and being connected in parallel with the other phase, said switch having a closed circuit and an open circuit position, said switch in closed circuit position producing one effect of the turns of the main and auxiliary phase, and when in open circuit position decreasing the effect of the turns of at least one of said phases.

9. A single phase condenser motor of the class described having two members constituting a stator and a rotor, a main phase winding for connection to a power line and an auxiliary phase winding on one of said members, said main phase winding and said auxiliary phase winding having a plurality of sections, condenser means having a plurality of sections, a four-arm bridge circuit formed of part of the sections of the main and auxiliary phases and the condenser means, each of two of the arms of the bridge circuit having at least one section of the main and auxiliary phase and the other two arms each having condenser means therein, a switch connected to the cross arms of the bridge circuit, said bridge circuit constituting a part of one of said phases and being connected in parallel with the other phase, said switch having a closed circuit and an open circuit position, said switch in closed circuit position producing a certain effective condenser capacity, and when in open circuit position decreasing the effective condenser capacity.

10. In a single phase condenser motor of the class described having two members constituting a stator and a rotor, a main phase winding for connection to a power line and an auxiliary phase winding on one of said members, one of said phase windings having a plurality of sections, condenser means having a plurality of sections, a four-arm bridge circuit formed by part of the sections of the last mentioned phase winding and the condenser means, each of two of the arms of the bridge circuit having at least one of the said sections of the last mentioned phase winding and the other two arms each having condenser means therein, a switch connected to the cross arms of the bridge circuit, said bridge circuit constituting a part of at least one of said phases and being connected in series with the remainder of one of said phases and in parallel with the other of said phases, said switch having a closed circuit and an open circuit position, said switch in closed circuit position producing a certain effective condenser capacity, and when in open circuit position decreasing the effective condenser capacity, the capacity of certain of said condenser means having different values.

11. In a single phase condenser motor of the class described having two members constituting a stator and a rotor, a main phase winding for connection to a power line and an auxiliary phase winding on one of said members, one of said phase windings having a plurality of sections, condenser means having a plurality of sections, a four-arm bridge circuit formed by part of the sections of the last mentioned phase winding and the condenser means, each of two of the arms of the bridge circuit having at least one of the said sections of the last mentioned phase winding and the other two arms each having condenser means therein, a switch connected to the cross arms of the bridge circuit, said bridge circuit constituting a part of at least one of said phases and being connected in series with the remainder of one of said phases and in parallel with the other of said phases, said switch having a closed circuit and an open circuit position, said switch in closed circuit position producing a certain effective condenser capacity, and when in open circuit position decreasing the effective condenser capacity, said switch being automatic and opening when the rotor approximates a predetermined speed.

12. In a single phase condenser motor of the class described having two members constituting a stator and a rotor, a main phase winding for connection to a power line and an auxiliary phase winding on one of said members, one of said phase windings having a plurality of sections, condenser means having a plurality of sections, certain of said sections having different values, a four-arm bridge circuit formed by part of the sections of the last mentioned phase winding and the condenser means, each of two of the arms of the bridge circuit having at least one of the said sections of the last mentioned phase winding and the other two arms each having condenser means therein, a switch connected to the cross arms of the bridge circuit, said bridge circuit constituting a part of at least one of said phases and being connected in parallel with the other of said phases, said switch having a closed circuit and an open circuit position, said switch in closed circuit position producing one effect of the turns of at least one of said phases and a certain effective condenser capacity, and when in open circuit position decreasing the effect of the turns in said last mentioned phase and the effective condenser capacity.

13. In a single phase condenser motor of the class described having two members constituting a stator and a rotor, a main phase winding for connection to a power line and an auxiliary phase winding on one of said members, one of said phase windings having a plurality of sections, condenser means having a plurality of sections, a four-arm bridge circuit formed by part of the sections of the last mentioned phase winding and the condenser means, each of two of the arms of the bridge circuit having at least one of the said sections of the last mentioned phase winding and the other two arms each having condenser means therein, a switch connected to the cross arms of the bridge circuit, said bridge circuit constituting a part of at least one of said phases and being connected in parallel with the other of said phases, said switch having a closed circuit and an open circuit position, said switch in closed circuit position producing one effect of the turns of at least one of said phases, and when in open circuit position decreasing the effect of the turns in said last mentioned phase.

14. In a single phase condenser motor of the class described having two members constituting a stator and a rotor, a main phase winding for connection to a power line and an auxiliary phase winding on one of said members, one of said phase windings having a plurality of sections, condenser means having a plurality of sections, a four-arm bridge circuit formed by part of the sections of the last mentioned phase winding and the condenser means, each of two of the arms of the bridge circuit having at least one of the said sections of the last mentioned phase winding and the other two arms each having condenser means therein, a switch connected to the cross arms of the bridge circuit, said bridge circuit constituting a part of at least one of said phases and being connected in parallel with the other of said phases, said switch having a closed circuit and an open circuit position, said switch in closed circuit position producing a certain effective condenser capacity, and when in open circuit position decreasing the effective condenser capacity.

15. A single phase reversible condenser motor of the class described having two members constituting a stator and a rotor, a main phase winding and an auxiliary phase winding on one of said members, means for connecting either said main phase winding or said auxiliary phase winding to a power line, at least one of said phase windings having a plurality of sections, condenser means having a plurality of sections, a four-arm bridge circuit formed by part of the sections of the last mentioned phase winding and the condenser means, each of two of the arms of the bridge circuit having at least one of said sections of the last mentioned phase winding and the other two arms each having condenser means therein, a switch connected to the cross arms of the bridge circuit, said bridge circuit constituting a part at least of one of said phases and being connected in parallel with one of said phases, said switch having a closed circuit and an open circuit position, said switch in closed circuit position producing one effect of the turns of at least one of said phases, and when in open circuit position decreasing the effect of the turns in said last mentioned phase.

16. A single phase reversible condenser motor of the class described having two members constituting a stator and a rotor, a main phase winding and an auxiliary phase winding on one of said members, means for connecting either said main phase winding or said auxiliary phase winding to a power line, at least one of said phase windings having a plurality of sections, condenser means having a plurality of sections, a four-arm bridge circuit formed by part of the sections of the last mentioned phase winding and the condenser means, each of two of the arms of the bridge circuit having at least one of said sections of the last mentioned phase winding and the other two arms each having condenser means therein, a switch connected to the cross arms of the bridge circuit, said bridge circuit constituting a part at least of one of said phases and being connected in parallel with one of said phases, said switch having a closed circuit and an open circuit position, said switch in closed circuit position producing a certain effective condenser capacity, and when in open circuit position decreasing the effective condenser capacity.

17. In a single phase condenser motor of the class described having two members constituting a stator and a rotor, a main phase winding for connection to a power line and an auxiliary phase winding on one of said members, one of said phase windings having a plurality of sections, condenser means having a plurality of sections, a four-arm bridge circuit formed by part of the sections of the last mentioned phase winding and the condenser means, each of two of the arms of the bridge circuit having at least one of the said sections of the last mentioned phase winding and the other two arms each having condenser means therein, a single pole switch connected to the cross arms of the bridge circuit, said bridge circuit constituting a part of at least one of said phases and being connected in series with the remainder of one of said phases and in parallel with the other of said phases, said switch having a closed circuit and an open circuit position, said switch in closed circuit position producing one effect of the turns of at least one of said phases, and when in open circuit position decreasing the effect of the turns in said last mentioned phase.

18. A single phase reversible condenser motor of the class described having two members constituting a stator and a rotor, a main phase winding and an auxiliary phase winding on one of said members, means for connecting either said main phase winding or said auxiliary phase winding to a power line, at least one of said phase windings having a plurality of sections, condenser means having a plurality of sections, a four-arm bridge circuit formed by part of the sections of the last mentioned phase winding and the condenser means, each of two of the arms of the bridge circuit having at least one of said sections of the last mentioned phase winding and the other two arms each having condenser means therein, a single pole switch connected to the cross arms of the bridge circuit, said bridge circuit constituting a part at least of one of said phases and being connected in parallel with one of said phases, said switch having a closed circuit and an open circuit position, said switch in closed circuit position producing a certain effective condenser capacity, and when in open circuit position decreasing the effective condenser capacity.

FRANK J. LYDEN.